United States Patent Office 3,440,094
Patented Apr. 22, 1969

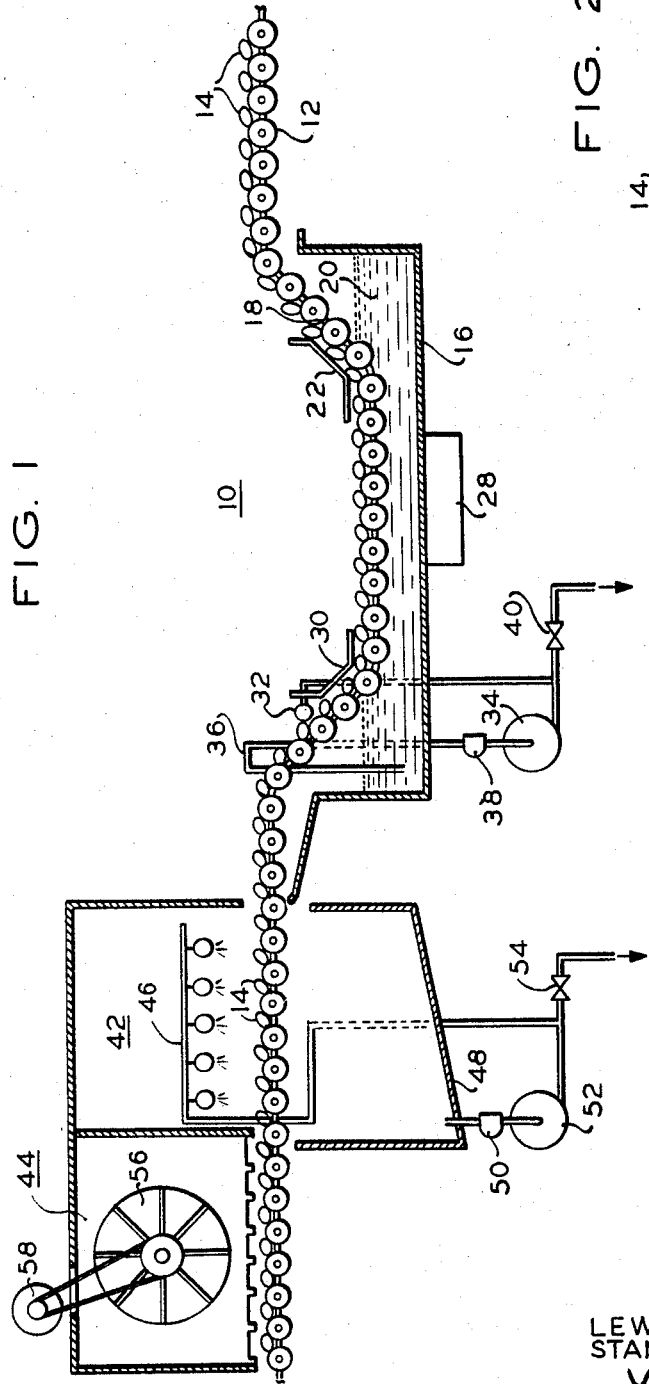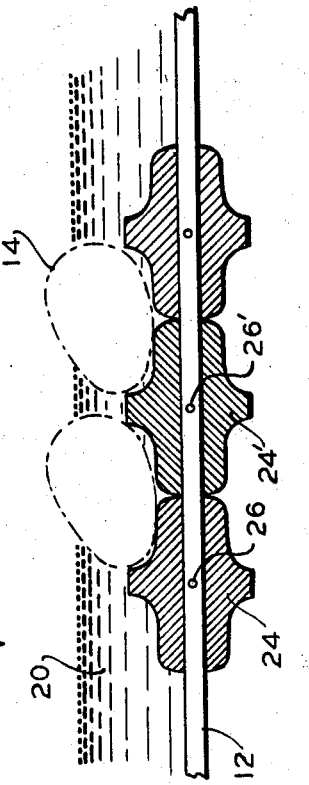

3,440,094
ULTRASONIC EGG CLEANING
Lewis Adam, Sea Girt, and Stanley S. Lanes, Matawan, N.J., assignors to Blaw Associates, c/o Ross E. Brown, Spring Lake, N.J., a partnership of New Jersey
Filed Oct. 19, 1966, Ser. No. 587,804
Int. Cl. B08b 3/10
U.S. Cl. 134—1         24 Claims In general, this invention relates to a new and improved method of and apparatus for cleaning eggs and more particularly, to a method of automatically cleaning eggs by ultrasonic techniques as the eggs are fed along a conveyor.

Presently, eggs are cleaned in existing commercial procedures by brushing techniques. This scrubbing of eggs has not achieved uniform cleaning with the resultant effect that after passing through the cleaning process certain eggs still have spots. These eggs join the normally cracked eggs to form the surplus for the egg producer which is sold at considerably less than the price received for clean eggs. This surplus or waste is not desirable from the egg producers point of view as, although there is a large market for cracked eggs, the extra handling required raises his costs with respect to an item wherein, necessarily, he must charge a lower price. Further, the dirty spots on eggs prevent their sales as whole or uncracked eggs because the dirty spots normally contain surface bacteria which makes them unfit for regular consumption by Department of Agriculture standards.

Some attempts at ultrasonic cleaning of eggs has been made in the past, but these techniques were not efficient as they required a long period of ultrasonic cleaning to achieve uniform cleaning. The long period of ultrasonic cleaning tended to cause increased porosity of the egg shell and breaking of the membrane. Further, these prior attempts were never successful on an automatic basis such as would be required for a commercially feasible egg cleaning procedure.

Thus, it is the general object of this invention to avoid and overcome the foregoing and other difficulties of prior art practices by the provision of a new and better method or an apparatus for cleaning eggs.

Another object of this invention is the provision of a new and better method of and apparatus for cleaning eggs by ultrasonic techniques in a simple and expeditious manner.

Still another object of this invention is the provision of a new and less expensive manner of continuously cleaning eggs by ultrasonic techniques wherein the eggs will be uniformly cleaned on all sides.

A further object of this invention is the provision of a new and better method of and apparatus for cleaning eggs wherein the eggs are passed through the ultrasonic bath for a very short time so as to avoid damage to the egg membrane or to cause substantially increased porosity of the shell.

A still further object of this invention is the provision of a new and better method of and apparatus for cleaning eggs operative in an automatic mode to clean and dry the eggs, remove the cleaning fluid, while recirculating the cleaning fluid to maintain the system operative over long periods of use.

For the purpose of illustrating the invention, there is shown in the drawings a form which is presently preferred; it being understood, however, that this invention is not limited to the precise arrangements and instrumentalities shown.

FIGURE 1 is a diagrammatic showing of apparatus for the ultrasonic cleaning of eggs of the present invention.

FIGURE 2 is an enlarged view of a portion of the conveyor belt within the ultrasonic bath.

The present invention provides a conveyor type ultrasonic cleaning system in which the conveyor has individual rotating support elements adapted to support eggs between adjacent rotating elements so that as the conveyor moves, the eggs supported thereon will be rotated. The eggs are passed through an ultrasonic cleaning tank with a small portion of the eggs remaining above the level of the liquid in the tank so that they will rest securely on the conveyor in a manner whereby the eggs will not be unduly moved due to the buoyancy effect of the liquid on the eggs. Within the ultrasonic cleaning tank, there is placed a cleaning fluid, preferably an alkali solution having a pH of approximately 12. It has been found that an alkali solution having hydroxy ions is substantially a bacteria static element for salmonella organisms. Thus, the solution having a pH of approximately 12 and which contains hydroxy ions is bacteria static to known pathogenic bacteria. In the preferred embodiment the alkali solution is a 50 percent solution of hypochloride of sodium.

The ultrasonic transducer utilized with the tank operates at a frequency between 20 and 90 kilocycles. It has been found that the most effective operating frequency range is between 60 and 80 kilocycles. The solution in the tank is continuously filtered and recirculated. The eggs are sprayed as they leave the ultrasonic cleaning tank, first with the cleaning solution and then with water to wash away the film of dirt removed by the ultrasonic cleaning and, additionally to remove the cleaning solution from the eggs. Thence, the conveyor passes through a drying chamber wherein the eggs are hot air dried.

It has been found that even the dirtiest eggs will be acceptably cleaned after completion of the process so that the egg producer will not have the problem of spotted eggs, and accordingly, he can regulate the number of surplus eggs available without the necessity of picking and examining eggs for spots as was required in the past.

In FIGURE 1, there is shown the apparatus of the present invention generally designated by the numeral 10. The apparatus 10 comprises a conveyor 12 supporting a plurality of eggs 14 thereon. The conveyor 12 has an initial portion which extends horizontally above a cleaning tank 16. Then, the conveyor 12 extends downwardly along an inclined plane 18 into cleaning fluid 20 within the tank 16. A suitable upper guide 22 guides the entrance of the eggs 14 into the cleaning fluid bath 20.

As shown in FIGURE 2, the eggs 14 are mounted on the individual rotatable elements 24, 24' forming the conveyor belt 12. The elements 24, 24' are each rotatable along an axis 26, 26' and are shaped with arcuate depressions on the four corners thereof so that, as the elements 24 and 24' rotate, they will continue to support the eggs 14. The elements 24 and 24' are made of injection molded plastic material which will be unaffected by the cleaning solution 20. Rotation of the elements 24 and 24' during movement of the conveyor 12 will cause rotation of the eggs 14 and accordingly, all portions of the eggs 14 will, at some time, be immersed in the cleaning fluid 20. It is preferred that the cleaning fluid 20 have its level slightly below the top surface of the eggs 14 so that only a small buoyancy effect exerted by the cleaning fluid 20 will be exerted on the eggs 14 and thus, the eggs 14 will tend to remain between adjacent elements 24, 24' of the conveyor 12.

The cleaning solution 20 is an alkali solution preferably having a pH of approximately 12 and, in the preferred embodiment, is a 50 percent solution of hypochloride of sodium. It has been found that the solution can vary in concentration approximately plus or minus 10 percent and that the pH of the solution can be slightly less than 12 while still remaining effective as a bacteria static element for salmonella organisms. It should be noted that the solution of hypochloride of sodium is one that contains hydroxy ions. It has been found that such a solution is bacteria static for the known pathogenic bacteria. Accordingly, this can prevent any pathogenic bacteria from remaining effective after the egg has passed through the solution.

An ultrasonic transducer 28 is positioned adjacent the bottom of the tank 16 so as to cause ultrasonic cavitation of the cleaning fluid 20 to thus clean the eggs 14 supported on the conveyor 12 as they pass through the cleaning fluid bath 20. The transducer 28 will be operative if its operating frequency is between 20 and 90 kilocycles per second. However, it has been found that, for best results, the transducer 28 should operate between 60 and 80 kilocycles per second and, in a preferred embodiment the transducer 28 operated at 75 kilocycles per second.

The conveyor 12 is driven at a speed which will allow the eggs 14 to pass through the bath 20 for a period less than three minutes and, in the preferred embodiment the eggs pass through the bath 20 in approximately one minute. This was sufficient time to effect the cleaning of all the eggs no matter how dirty or soiled they were prior to entering the cleaning tank 16. The eggs 14 on the conveyor 12 are then guided upward and out of the bath 20 by an exit guide 30. As the eggs pass out of the bath 20, they are sprayed with cleaning solution by a spray nozzle 32. The spray nozzle 32 operates to spray the cleaning solution 20 to remove the dirt film which lays loosely on the shell of the eggs 14 after passing through the tank 16. The spray nozzle 32 receives the spray solution from a pump 34 drawing from a syphon 36 through a filter 38. The syphon 36 draws from the cleaning fluid bath 20 so that the cleaning fluid 20 is continuously filtered by the filtering unit 28 during the operation of the spray 32. After a given period of time, the tank 16 may be drained by valve 40.

It should be noted that the tank 16 is preferably stainless steel so as not be affected by the alkali cleaning solution 20 and, additionally, the tank 16 is isolated from the non-metallic conveyor 12 so as to avoid any vibration being transmitted to the conveyor 12.

The filtering unit 38 is operative with valve 40 to maintain the pH of the cleaning solution 20 constant.

After the conveyor 12 leaves the tank 16, it extends horizontally through a wash chamber 42 and a dry chamber 44. In the wash chamber 42 a series of spray nozzles 46 spray wash water over the eggs 14. This wash water is collected in the sump 48 of the chamber 42 and drawn through a filter 50 to pump 52 which supplies the spray nozzles 46. The wash water removes the alkali cleaning fluid solution from the eggs 14. If the water being reused starts to approach the alkalinity of the cleaning solution it is drained through a valve 54 and fresh water is supplied. After the eggs have been washed by the spray nozzles 46 and the wash chamber 42, they enter the air dry chamber 44 wherein a fan wheel 56 driven by a motor 58 air dries the eggs. It will be noted that this has been a continuous operation from the supplying of the eggs to their leaving the air drying chamber 44. Further, as shown in the actual embodiment of the present invention, there is virtually no need for inspecting the eggs for spots after passing through the apparatus 10 as all of the eggs will be cleaned in this simple and expeditious manner. Thus there is no waste during the cleaning process and a large number of eggs can be quickly cleaned at a relatively inexpensive cost.

The present invention may be embodied in other specific forms without departing from the spirit or essential attributes thereof, and accordingly, reference should be made to the appended claims rather than to the foregoing specification as indicating the scope of the invention.

We claim as our invention:

1. The method of cleaning eggs comprising the steps of providing alkaline cleaning solution, ultrasonically cavitating the cleaning solution, continuously feeding eggs into, through and out of said ultrasonically cavitated cleaning solution, each of said eggs being fed through said solution for less than three minutes, and continuously washing said eggs with water after said eggs are fed out of said cleaning solution.

2. The method of cleaning eggs of claim 1 wherein said step of providing an alkaline solution includes providing an alkaline solution having hydroxy ions.

3. The method of cleaning eggs of claim 2 wherein said step of providing an alkaline solution includes providing an alkaline solution having a pH of approximately 12.

4. The method of cleaning eggs of claim 3 wherein said step of providing an alkaline cleaning solution includes providing a 50 percent solution of hypochlorite of sodium.

5. The method of cleaning eggs of claim 1 wherein said step of providing an alkaline solution includes providing an alkaline cleaning solution having a pH of approximately 12.

6. The method of cleaning eggs of claim 5 including the step of continuously washing said eggs with cleaning solution prior to continuously washing said eggs with water, said step of continuously washing said eggs with cleaning solution being intended to remove any loose film on said eggs.

7. The method of cleaning eggs of claim 5 including the step of maintaining the cleaning solution at a pH of approximately 12, said step of maintaining the cleaning solution including the step of continuously sensing the cleaning solution for the pH thereof.

8. The method of cleaning eggs of claim 1 wherein said step of feeding eggs through said cleaning solution is completed in approximately one minute.

9. The method of cleaning eggs of claim 1 wherein said step of cavitating cleaning solution comprises ultrasonically cavitating the cleaning solution at a frequency between 60 and 80 kilocycles per second.

10. The method of cleaning eggs of claim 1 wherein the step of continuously feeding the eggs includes continuously rotating the eggs as they pass through the cleaning solution to achieve maximum cleaning thereof.

11. The method of claim 10 wherein during said step of feeding the eggs through said cleaning solution, said eggs are immersed to a depth of less than the height of the eggs so as to limit the buoyant forces on the eggs.

12. The apparatus for cleaning eggs comprising conveyor means for holding and continuously feeding eggs, a tank for receiving cleaning solution, said conveyor passing through said tank, ultrasonic transducing means associated with said tank for cavitating cleaning solution therein, first wash means positioned adjacent said conveyor as it leaves said tank for washing eggs with water after the eggs leave the tank on the conveyor.

13. The apparatus for cleaning eggs of claim 12 wherein said ultrasonic transducing means is operative at a frequency of between 20 and 90 kilocycles per second.

14. The apparatus for cleaning eggs of claim 12 wherein said ultrasonic transducing means is operative at a frequency of between 60 and 80 kilocycles per second.

15. The apparatus for cleaning eggs of claim 12 wherein said conveyor means includes individual rotary elements said rotary elements being operative to cause rotation of eggs supported thereon as said conveyor passes through the cleaning fluid in said tank.

16. The apparatus for cleaning eggs of claim 15 wherein said rotary elements co-operate in a manner whereby two rotary elements support any individual egg.

17. The apparatus for cleaning eggs of claim 15 wherein said conveyor is positioned in said tank in a manner whereby eggs supported on said rotary elements are partially exposed above the level of the cleaning solution in said tank.

18. The apparatus of claim 12 including cleaning solution in said tank, said cleaning solution having a pH of approximately 12.

19. The apparatus of claim 12 including cleaning solution in said tank, said cleaning solution having hydroxy ions.

20. The apparatus of claim 19 wherein said cleaning solution has a pH of approximately 12.

21. The apparatus of claim 20 wherein said cleaning solution is a 50 percent solution of hypochlorite of sodium.

22. The apparatus of claim 18 including means for maintaining the pH of said cleaning solution substantially constant.

23. The apparatus of claim 12 including second wash means positioned adjacent said conveyor between said first wash means and said tank, said second wash means being operative to spray with cleaning solution eggs on said conveyor to remove any loose film on the eggs.

24. The apparatus for cleaning eggs of claim 23 wherein said second wash means draws cleaning solution from within said tank to spray the eggs, said first wash means being operative to remove the cleaning solution from said eggs after operation of said second wash means.

References Cited

UNITED STATES PATENTS

| | | | |
|---|---|---|---|
| 1,530,415 | 3/1925 | Roussel | 15—3.15 |
| 2,891,561 | 6/1959 | Hagans | 134—111 XR |
| 3,033,710 | 5/1962 | Hightower et al. | 134—75 |

MORRIS O. WOLK, *Primary Examiner.*

J. D. OLSEN, *Assistant Examiner.*

U.S. Cl. X.R.

259—1; 15—3.15; 68—3